(12) United States Patent
Goden

(10) Patent No.: US 7,009,613 B2
(45) Date of Patent: Mar. 7, 2006

(54) GAME DEVICE, METHOD OF PROCESSING AND RECORDING MEDIUM FOR THE SAME

(75) Inventor: Takeshi Goden, Tokyo (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 131 days.

(21) Appl. No.: 09/985,583

(22) Filed: Nov. 5, 2001

(65) Prior Publication Data

US 2002/0024521 A1 Feb. 28, 2002

Related U.S. Application Data

(62) Division of application No. 08/981,655, filed as application No. PCT/JP97/01515 on May 2, 1997.

(30) Foreign Application Priority Data

May 2, 1996 (JP) .................................. 8-111566

(51) Int. Cl.
*G06T 15/70* (2006.01)

(52) U.S. Cl. ...................... 345/473; 715/757; 382/295; 382/296

(58) Field of Classification Search .................. 465/67; 482/57; 345/473, 7, 8, 419, 420, 427, 474, 345/475, 633, 672, 679, 681; 382/293, 295, 382/296; 463/30, 31, 32; 715/757
See application file for complete search history.

(56) References Cited

U.S. PATENT DOCUMENTS

| 4,148,485 | A | | 4/1979 | Rains ........................ 273/86 B |
|---|---|---|---|---|
| 4,978,300 | A | * | 12/1990 | Letovsky et al. ............. 434/61 |
| 5,366,376 | A | | 11/1994 | Copperman et al. .......... 434/69 |
| 5,405,151 | A | | 4/1995 | Naka et al. ................. 273/437 |
| 5,547,382 | A | * | 8/1996 | Yamasaki et al. ............. 434/61 |

FOREIGN PATENT DOCUMENTS

| EP | 0 761 267 | 3/1997 |
|---|---|---|
| JP | H7-230559 | 8/1995 |
| JP | H7-244746 | 9/1995 |

* cited by examiner

*Primary Examiner*—Ulka J. Chauhan
*Assistant Examiner*—Enrique L. Santiago
(74) *Attorney, Agent, or Firm*—Finnegan, Henderson, Farabow, Garrett & Dunner, L.L.P.

(57) ABSTRACT

A game device models images of moving images such as motor-bikes or cars moving through a virtual space. The track along which a first such moving object moving through the virtual space is sampled at a prescribed interval in time in order to generate track data $P_1$–$P_6$, while transit points $P_1'$–$P_6'$ are set at prescribed intervals of distance along the track indicated by the track data. A second moving object is moved in such a manner as to pass through these transit points. Accordingly, a course is set that is commensurate with the player's skill level so that the degree of difficulty of the game is not diminished by the degree of experience of the player.

6 Claims, 9 Drawing Sheets

TRACK DATA —△— SAMPLING POINT

TRACK —○— TRANSIT POINT

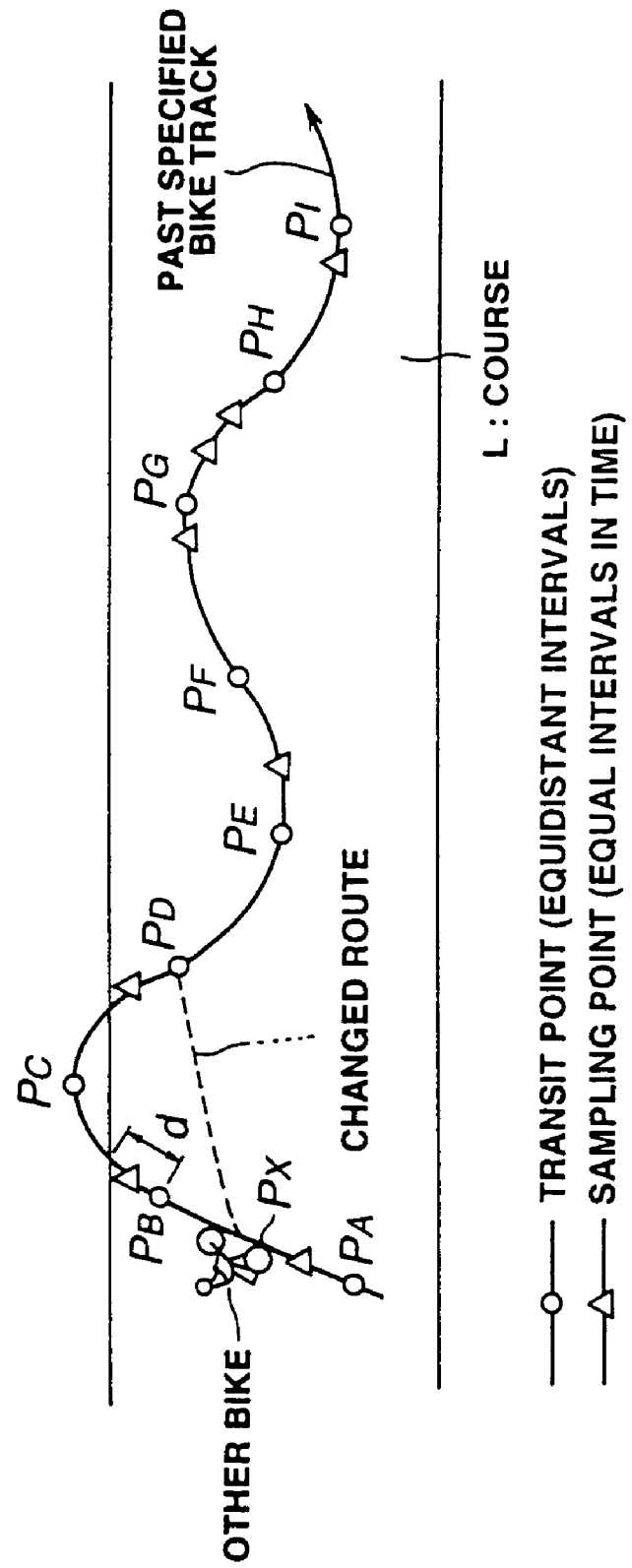

VIEW FROM SIDE

RIGHT CURVE ← ↓ ↘ LEFT CURVE
STRAIGHT AHEAD
FRONT VIEW

VIEW FROM SIDE

FRONT VIEW

GAME DEVICE, METHOD OF PROCESSING AND RECORDING MEDIUM FOR THE SAME

This is a division of application Ser. No. 08/981,655, filed Dec. 31, 1997 which is incorporated herein by reference which is a 371 of PCT/JP97/01515, filed May 2, 1997.

TECHNICAL FIELD

The present invention relates to a game device to be mounted in a video game machine or elsewhere, and in particular to an improved technology for generating images modelled on a motorbike or similar moving object.

BACKGROUND ART

Advances in computer graphics technology in recent years have led to the appearance of game devices which display virtually generated space (hereinafter referred to as 'virtual space') as an image observed from one viewpoint within the space (hereinafter referred to as 'virtual image'). Among such game devices, those which are based on motor-bike and similar races continue to be very popular.

In the following description, the word 'bike' is to be taken to signify a motor-bike (moving object) which is displayed in virtual space as a running model for playing the game. In particular, the motor-bike which the player himself operates will be referred to as a 'specific bike', while bikes other than the specific bike which compete with the specific bike will be referred to as 'other bikes'. Similarly, the word 'run (ning)' is to be taken to signify the conceptual running of the bike along a 'course' set within virtual space. Video game devices of this sort comprise an input device which is modelled on a real bike and generates operating signals when operated by the player, a data processing device (CPU) which controls the running of the bike in accordance with operating signals supplied from the input device on the basis of image and other data determining the position of objects (including both moving objects such as people or cars, and static objects such as buildings or stones), and a display device which generates the image of the bike and displays it together with background and other images on a screen. Image data and the various types of data which are necessary in order to control the running of the bike are stored in a memory.

Playing the game consists in causing the specific bike operated by the player to run along a course together with other bikes, whereof the running is controlled by the game device, the two competing to win the track record. The player manages the corners (curves) in the course by tilting the input device in the same way as if he were riding a motor-bike along a real racing course, and operates the 'throttle' and 'brakes' on the input device. The data processing device specifies the position of the specific bike on the basis of the operating signals which are supplied in accordance with the operation of the player, and also specifies the running positions of the other bikes. The display device generates image data showing the virtual space from the position of the specific bike on the basis of image data of the other bikes, background and other details within the virtual space as specified by the data processing device. The player operates the input device while watching the image which is displayed on a screen fitted to the front of the input device. Thus, the player is able to enjoy playing the game with a sensation resembling that of driving a real motor-bike.

Hitherto it has been normal for track data, which is programmed in advance into the memory, to be used to run the other bikes with which the player competes. This track data consists of rows of position coordinates along the course. The data processing device reads these position coordinates with a fixed timing, and controls the running of the other bikes in such a way that they pass through the coordinates which have been read.

However, this conventional video game device suffers from the following drawback.

Details of the path cannot be altered once they have been programmed. If a player is accustomed to the trajectories along which the other bikes run in accordance with this track data, it becomes easy for him to win as he gains in experience. This means that the game becomes simple for him, and he loses interest. If large numbers of players become experienced in the same type of game in this manner, the popularity of the game soon wanes.

One possible way of counteracting this would be for the track data of the bike which a player has actually operated to be used without modification as track data for the other bikes. However, it is thought that doing this would result in an unnatural image being displayed.

The track data of a specific bike is obtained in the form of a row of position coordinates which have been sampled with a fixed timing along the route which that bike traversed when operated by a player. To utilise these as the path for another bike involves reading this row of position coordinates in the correct order with a fixed timing, and controlling the running of the other bike in such a manner that it passes through the position coordinates which have been read.

However, it is not always the case that the player's operations are perfect, and he will often collide into the side wall (the fence or wall which separates the spectators from the course) or into other bikes. If the running of the other bikes is to be controlled on the basis of track data which has been obtained under conditions of operation of this sort, the same running conditions will be reproduced as when the data was obtained. In other words, the other bikes which are running on the basis of this track data will run in an unnatural manner, colliding into the side wall or into objects irrespective of whether there are other bikes in the vicinity.

Consequently, in order to solve this drawback, it becomes necessary to correct the track data where this causes it to look as if the bike has left the course, and to generate data so that the bike does not stop even if the path is such that two bikes collide with each other and suddenly stop.

Moreover, as FIG. 9A demonstrates, conventional video game devices generate the image on the presupposition that the viewpoint used for generating the virtual image while running (shown by the camera C) is located on the bike.

However, an image obtained in this manner does not necessarily reflect the image which someone actually riding on a bike normally perceives. To take the example of cornering during a race, an actual rider will tilt the body of the bike and lean outwards, while keeping his head vertical. Thus, in the view as perceived by the rider the horizon scarcely tilts at all.

In conventional video games, on the other hand, since the camera is located on the specific bike B as shown in FIG. 9A, the camera tilts together with the specific bike B in relation to the road surface when the bike itself tilts while cornering, and an image is generated in which the whole horizon tilts (FIG. 9B).

If the bike topples over, the rider should really be thrown off it, and the image should be displayed from the perspective of the rider who has been thrown. However, if the camera is situated on the bike, the image which is displayed is as viewed from the toppled bike. Thus, in order to solve drawbacks of this kind, the camera (viewpoint) needs to be relocated where an actual rider perceives it.

SUMMARY OF THE INVENTION

With a view to solving the abovementioned problems, it is a first object of the present invention to provide a game which players will not tire, this object being achieved by using the track data whereby a player caused one moving body to run for the purpose of generating data which causes the other moving bodies to run. Moreover, it is a second object of the present invention to provide a natural and realistic image, by determining the actual position of the driver's perspective and generating a virtual image from that position.

The game device described in claim 1 is designed to solve the first problem, and is a game device wherein images of objects (modelled on motor-bikes or cars) moving through a virtual space are generated, characterised in that track data (rows of position coordinates acquired with a fixed timing, etc.) is generated by sampling at stipulated intervals of time the path along which a first moving object has moved, transit points (points at fixed intervals along the course etc.) are set at stipulated intervals of distance along the path indicated by the track data, and a second moving object is caused to move in such a manner as to pass through the transit points.

The game device of claim 2 is one as described in claim 1, wherein if while the second moving object is being moved in such manner as to pass through the transit points it is judged likely to collide into an obstacle within the virtual space, the second moving object is allocated a new course (change of path, acceleration, deceleration, stop, etc.) which allows it to avert the collision.

It should be added that the word 'obstacle' as used here signifies not only static objects such as walls and posts, but is a concept which includes running moving objects (whether this be a first or a second moving object) and even the road surface itself.

The game device described in claim 3 is designed to solve the first problem, and is a game device wherein images of a plurality of objects moving through a virtual space are generated, characterised in that it has means for generating track data whereby track data is generated by sampling at stipulated intervals of time the path along which a specific moving object from among the plurality of moving objects moves in response to an externally supplied operational signal (a signal generated as a result of the operation of the input device by a player), means for setting transit points whereby transit points are set at stipulated intervals of distance along the course indicated by the track data on the basis of track data generated in the past by the means for generating track data, and means for control whereby each of the other moving objects is caused to move along a route which passes through the transit points set by the means for setting transit points.

The game device described in claim 4 is designed to solve the first problem, and is a game device as described in claim 3, wherein the means for generating track data has a memory wherein the track data for supplying to the means for setting transit points is stored, a sampling unit whereby positional data relating to the other moving objects indicated by the operational signals is acquired with a prescribed sampling timing, and the aggregate of the positional data which has been sampled is stored in the memory as new said track data, and a comparing output unit whereby every time the new track data is stored from the sampling unit, the new track data is compared on the basis of pre-programmed conditions of comparison (e.g. number of sampling points or comparative low frequency of collisions) with track data which has been stored in the memory in the past, and if it is judged to meet the conditions of comparison, stores the new track data in the memory as track data to be output to the means for setting transit points.

The game device described in claim 5 is designed to solve the first problem, and is a game device as described in claim 3, wherein the means for generating track data has a unit for setting a curvilinear route, whereby on the basis of the track data supplied from the means for generating track data a curvilinear route is set which passes through those points which are indicated by the positional data which constitutes the track data, and a unit for setting transit points, whereby transit points are set in such a manner that they are each roughly equidistant along the curvilinear route set by the unit for setting a curvilinear route.

The game device described in claim 6 is designed to solve the first problem, and is a game device as described in claim 3, wherein the means for control has means for assessing collisions whereby on the basis of data regarding the transit points, indicating the transit points which each of the other moving objects has passed, and data regarding the position of obstacles, indicating the position of the obstacles which exist within the virtual space, the distance between a given other moving object and a given obstacle is calculated, and it is assessed whether or not a collision will take place between the other moving object and the obstacle, and means for controlling running whereby if it is judged that a said other moving object will collide with the obstacle, a new route is allocated to the other moving object so as to avert collision with the obstacle.

The game device is designed to solve the second problem, and is a game device wherein viewpoint images are generated whereby a virtual space is viewed from a stipulated viewpoint which moves together with a specific moving object (e.g. a moving object which moves in accordance with the operations of a player), characterised in that the stance of the moving object within the virtual space is determined, the position of the viewpoint of the virtual driver who moves together with the moving object is determined, and the viewpoint image of the virtual space viewed from the position of the viewpoint is generated.

The game device is designed to solve the second problem, and is a game device wherein viewpoint images are generated whereby a virtual space is viewed from a stipulated viewpoint which moves together with a specific moving object, characterised in that it has means for determining stance whereby the stance of the moving object within the virtual space is determined, means for determining head position whereby on the basis of the stance of the specific moving object determined by the means for determining stance, relative position coordinates between the head of the virtual driver, which moves with the specific moving object, and the specific moving object itself are determined, and means for controlling display whereby the viewpoint is set on position coordinates determined by the means for determining head position, and the viewpoint image is generated by approximating the direction of a specified coordinate axis of the viewpoint image viewed from the viewpoint to a preset vertical direction in the space.

The game device is designed to solve the second problem, and is a game wherein images of objects moving through a virtual space are generated, characterised in that track data is generated by sampling at stipulated intervals of time the path along which a first moving object has moved, transit points are set at stipulated intervals of distance along the path indicated by the track data, and a second moving object is caused to move in such a manner as to pass through the transit points.

The game device is designed to solve the second problem, and is a game, wherein if while the second moving object is being moved in such a manner as to pass through the transit points it is judged likely to collide into an obstacle within the virtual space, the second moving object is allocated a new course which allows it to avert the collision.

The game device is designed to solve the second problem, and is a method of processing a game wherein viewpoint images are generated whereby a virtual space is viewed from a stipulated viewpoint which moves together with a specific moving object, characterised in that the stance of the moving object within the virtual space is determined, the position of the viewpoint of the virtual driver who moves together with the moving object is determined, and the viewpoint image of the virtual space viewed from the position of the viewpoint is generated.

The game device is designed to solve the second problem, and is a machine-readable recording medium whereon a game processing program has been recorded whereby images of objects moving through a virtual space are generated, characterised in that track data is generated by a computer by sampling at stipulated intervals of time the path along which a first moving object has moved, transit points are set at stipulated intervals of distance along the path indicated by the track data, and a second moving object is caused to move in such a manner as to pass through the transit points.

The game device is designed to solve the second problem, and is a machine-readable recording medium whereon a game processing program has been recorded whereby images of objects moving through a virtual space are generated, characterised in that track data is generated by a computer by sampling at stipulated intervals of time the path along which a first moving object has moved, transit points are set at stipulated intervals of distance along the path indicated by the track data, and a second moving object is caused to move in such a manner as to pass through the transit points, and if while the second moving object is being moved in such manner as to pass through the transit points it is judged likely to collide into an obstacle within the virtual space, the second moving object is allocated a new course which allows it to avert the collision.

The game device is designed to solve the second problem, and is a machine-readable recording medium whereon a game processing program has been recorded whereby images of objects moving through a virtual space are generated, characterised in that the stance of the moving object within the virtual space is determined by a computer, the position of the viewpoint of the virtual driver who moves together with the moving object is determined, and the viewpoint image of the virtual space viewed from the position of the viewpoint is generated.

BRIEF DESCRIPTION OF THE DRAWINGS

FIG. 7 is an explanatory diagram illustrating how the route is altered in an aspect of the present invention;

BEST MODE FOR CARRYINGOUT THE INVENTION

There follow detailed descriptions of embodiments of the present invention in accordance with the attached drawings.

I. Configuration (Configuration)

The video game device to which the present invention pertains provides a game modelled on a motor-bike race, whereby a player operates one bike (a specific bikes) from among a plurality of bikes.

Figure 1:
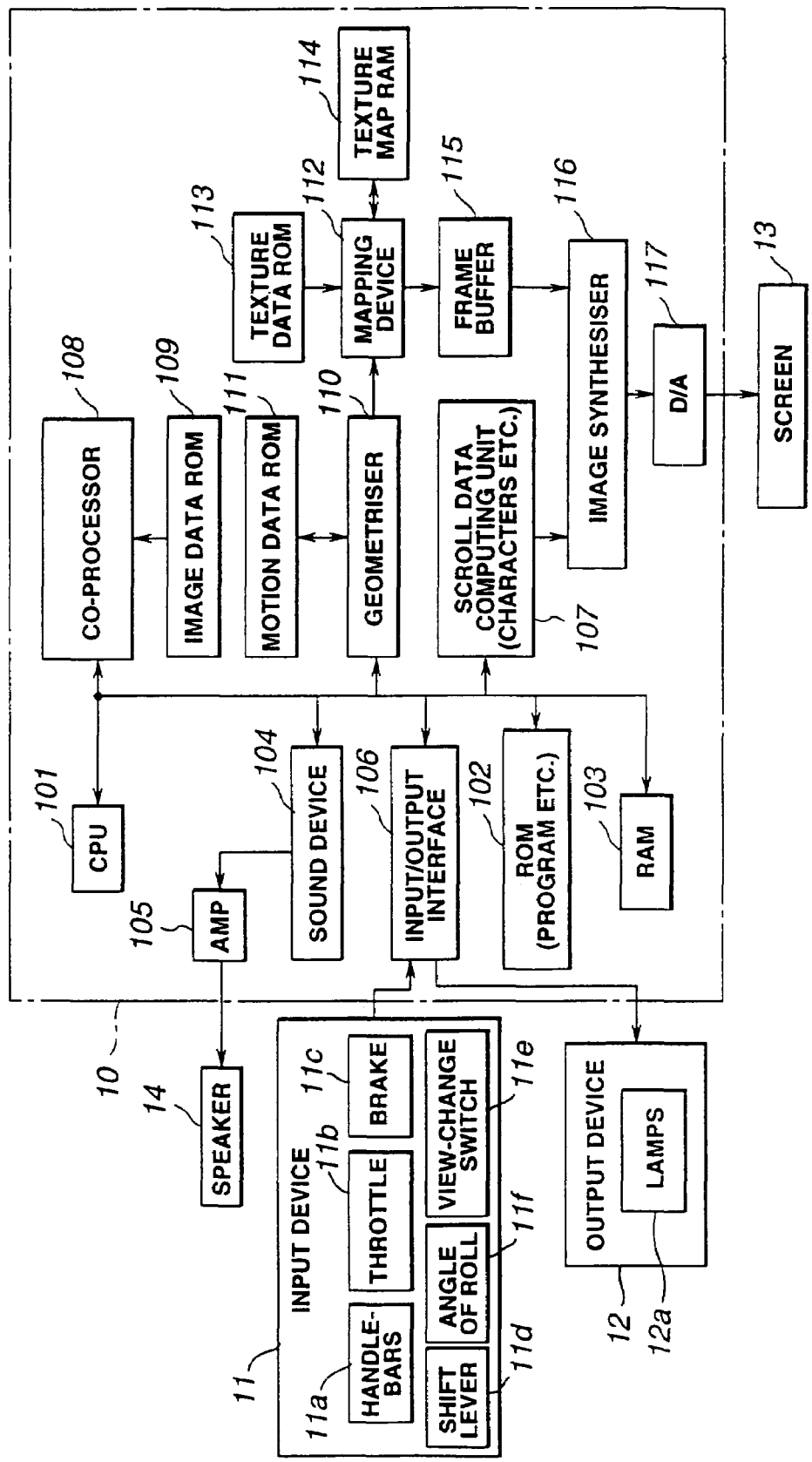
FIG. 1 is a block diagram illustrating a video game device which is an aspect of the present invention.

FIG. 1 is a block diagram illustrating a video game device which is an aspect of the present invention.

The present video game device comprises a game processing board 10, input device 11, output device 12, screen 13 and speaker 14.

The input device 11 is an operational device which imitates a real motor-bike, and is structured in such a manner that the player can mount it. Once mounted, the player operates handlebars 11a, throttle 11b, brake 11c, shift lever 11d and other elements necessary for driving a motor-bike in the same manner as on a real motor-bike. There is also a view-change switch 11e, and a sensor 11f which detects the angle of roll when the player inclines his body and the whole device tilts.

The view-change switch 11e is an operational element for the purpose of altering the viewpoint of the viewpoint image displayed on the screen 13.

The output device 12 corresponds to the direction-indicator lamp and tail lamp 12a which are fitted to the input device 11, and is configured and controlled by the CPU in such a manner as to be capable of flashing in response to the state of the operation.

The game processing board 10 has in addition to a CPU 101, a ROM 102, RAM 103, sound device 104, input/output interface 106, scroll data calculation unit 107, co-processor 108, image data ROM 109, geometriser 110, motion data ROM 111, drawing device 112, texture data ROM 113, texture map RAM 114, frame buffer 115, image synthesiser 116 and D/A converter 117.

The CPU 101 is connected to the ROM 102, RAM 103, sound device 104, input/output interface 106, scroll data calculation unit 107, co-processor 108 and geometriser 110 by way of bus lines.

The ROM 102 is configured in such a manner as to be capable of storing program data both for playing the game and for image processing. The RAM 103 is configured in such a manner as to be capable of writing and reading commands for the geometriser and data which is required for various types of calculation.

The sound device 104 is configured in such a manner as to be capable of generating acoustic signals on the basis of sound-source control signals fed by the program. A power amplifier 105 is configured in such a manner as to be capable of amplifying these acoustic signals and feeding them to the speaker 14.

The input/output interface 106 is connected to the input device 11 and output device 12, and is configured in such a manner as to feed operational signals $S_D$ generated by the input device 11 as digital data to the CPU 101, and output flash signals of the lamp relayed from the CPU 101 to the output device 12. The scroll data calculation device 107 is configured in such a manner as to be capable of controlling the display of character, background image and other data (stored in the ROM 102).

The co-processor is configured in such a manner as to be capable of high-speed calculation of collision assessment and other specific details. The image data ROM is configured in such a manner as to be able to store the polygon data which is required for the assessment of collisions and other purposes.

The word 'polygon' here refers to small polygonal shapes (triangles, quadrangles etc.) which form objects such as bikes, route, obstacles, buildings and people for the purpose of display. Polygon data is data which specifies the constituent polygon by means for the coordinate value of the vertex of each polygon.

The geometriser 110 is connected to a motion data ROM 111 and mapping device 112, and is configured in such a manner as to be capable of altering the field of view in the polygon data relayed from the motion data ROM 111.

The motion data ROM 111 is configured in such a manner as to be capable of storing, as motion data, polygon data relating to the player's bike, other (rival) bikes, and other objects which move. The polygon data which is stored in this motion data ROM 111 is comparatively fine (the area of each polygon is small), being for detailed display in contrast with the coarser polygon data of the image data ROM 109, where the area of each polygon is greater but is nevertheless sufficient for the co-processor to assess collisions and other details.

The mapping device 112 is configured in such a manner as to be capable of mapping texture (patterns, colours and combinations thereof) on to the polygon data defined in the field of view coordinates system. The texture map RAM 114 is configured in such a manner as to be capable of texture data for use in texture mapping calculations in the mapping device 112. The frame buffer 115 stores image data where texture mapping is complete. The image synthesiser 116 synthesises data from the scroll data calculation device, and polygon data which has been stored temporarily in the frame buffer 115, in an order of precedence which is stipulated by the CPU, and is configured in such a manner as to be capable of generating frame image data. The D/A converter 117 is configured in such a manner as to be capable of outputting frame image data to the screen 13 after converting it to analog signals.

(Action)

When the player mounts the input device 111, he operates the handlebars 11a, throttle 11b, brake 11c and shift lever 11d in the same way as if he were driving a real motor-bike. These operations are fed in the form of operational signals $S_D$ to the game processing board 10. Similarly, if the player inclines his body and tilts the whole input device, the sensor 11f detects this tilt (angle of roll), and an operational signal $S_D$ corresponding to the angle of roll is fed to the game processing board 10.

The input device 11 is located in front of the screen 13. Thus, the player is able to operate the input device 11 while viewing the image of the course displayed on the screen 13 with the same sensation as if he were driving a real motor-bike.

The CPU 101 implements the program data which has been stored in the ROM 102. When an operational signal $S_D$ is fed from the input device 11, it simulates the bike running along a course which is set within a virtual space.

First, the CPU 101 determines the three-dimensional coordinates of the course, obstacles, bikes and other objects within the virtual space (world coordinate system). This will be explained in detail later on.

When determining the coordinate values of objects, the co-processor 108 reads the polygon data relating to bikes, course, obstacles, buildings, people and other objects from the image data ROM 109, sets the path for each bike, assesses collisions between bikes, and feeds the results of this assessment to the CPU 101. The CPU 101 determines the three-dimensional coordinate values of the object with reference to the results of the assessment by the co-processor 108. Then the CPU 101 feeds the polygon data for these objects, together with the coordinate values (world coordinate system) and conversion matrix data for converting these coordinate values into a field of view coordinates system, to the geometriser 110.

The geometriser 110 makes use of the conversion matrix data relayed from the CPU 101 to convert the world coordinate system coordinate values of the object into its coordinate values in the field of view coordinates system. As a result, an image is generated wherein is a virtual space including the object defined three-dimensionally is projected on to a two-dimensional plane which is located in front of the viewpoint.

The mapping device 112 implements shadow processing on the object which has been defined in the field of view coordinates system, and uses the texture data ROM 113 and texture map RAM 114 to spread (affix) texture data on to the surface of the polygons which can be seen from the viewpoint. The image data with affixed texture data is output to the frame buffer 116, and after being synthesised with image data from the scroll data calculation device 107, is output to the screen 113.

(Configuration and Action of Functional Blocks)

Figure 2:
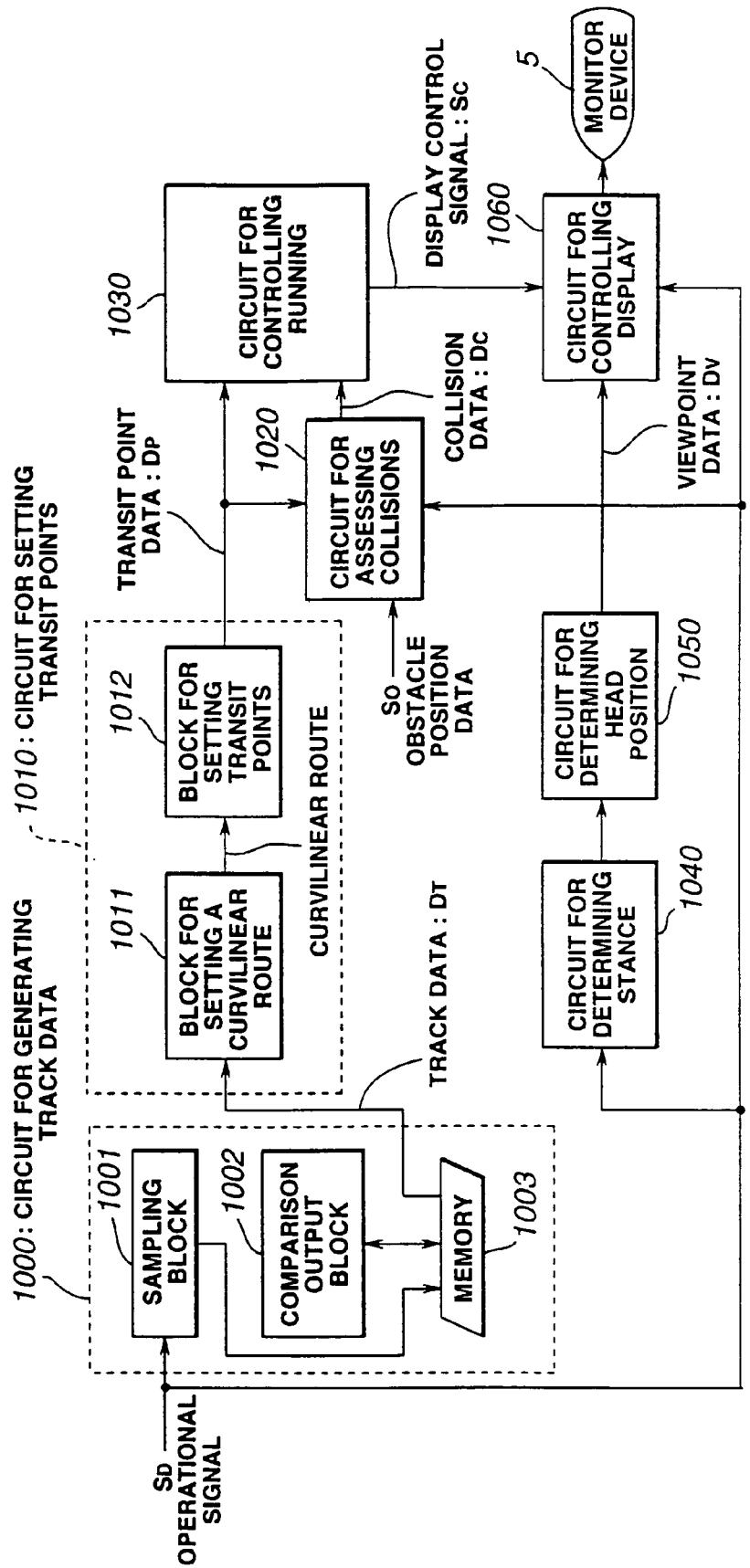
FIG. 2 is a diagram illustrating a functional block in the present invention.

FIG. 2 is a diagram illustrating a functional block in the present invention as implemented by means for the above hardware. These functional blocks are realised chiefly by implementing program data which the CPU 101 has stored in the ROM 102. The functional blocks are divided into a system for solving the first problem and one for solving the second problem.

The system for solving the first problem which the present invention seeks to solve comprises a circuit 1000 for generating track data, a circuit 1010 for setting transit points, a circuit 1020 for assessing collisions, and a circuit 1030 for controlling running. The system for solving the second problem comprises a circuit 1040 for determining stance, a circuit 1050 for determining head position, and a circuit 1060 for controlling display.

The circuit 1000 for generating track data has a sampling block 1001, a comparison output block 1002, and a memory 1003. The memory 1003 corresponds to the RAM 103 of FIG. 1. The circuit 1010 for setting transit points has a block 1011 for setting a curvilinear route, and a block 1012 for setting transit points.

In the above configuration, the sampling block 1001 samples the position coordinates (x, y, z) in the three-dimensional coordinates system (world coordinates system) for a specific bike moving along the course in accordance with an operational signal $S_D$. It does so for each display cycle (vertical synchronisation period etc.) of the image, and stores the position coordinates in the memory 1003. The aggregate of the position coordinates stored in the memory 1003 during one run around the course by the specific bike may be called its track data $D_T$. The comparison output block 1002 takes the track data $D_T$ stored in the memory 1003, and compares the best track data (when the course was completed in the fastest time: referred to hereinafter as the 'best record') and the track data which has been newly acquired as a result of the run of the specific bike to determine which is the new best record.

The block 1011 for setting a curvilinear route sets a curvilinear route in such a manner as makes it possible to pass through each of the position coordinates of the track data $D_T$. The block 1012 for setting transit points sets transit points at equidistant intervals along the curvilinear route set by the block 1011 for setting a curvilinear route, and outputs the aggregate of the transit points as transit point data $D_P$.

The circuit 1020 for assessing collisions determines, with reference to transit point data, the operational signal $S_D$ and obstacle position data $S_O$ contained within the image data, whether or not each of the objects will collide. If they will collide, it outputs collision data $D_C$.

The circuit 1030 for controlling running controls the running of the other bikes along the course with reference to the transit point data $D_P$. In determining the path of the other bikes, the circuit 1030 for controlling running alters the state of their running with reference to the collision data $D_C$ when there is a risk that they may collide. The state of running of each bike is output as a display control signal $S_C$. Meanwhile, the circuit 1040 for controlling stance acquires data on the angle of roll with reference to the operational signal $S_D$, and determines the stance of the specific bike. The circuit 1050 for determining head position assumes that a fictional rider is riding on the specific bike, and on the basis of the stance of the specific bike as determined, simulates the stance which an actual rider would normally assume. From this stance it then determines the position coordinates of the viewpoint in the head of the fictional rider, and outputs it as viewpoint data $D_V$. The circuit 1060 for controlling display generates an image whereby each bike is viewed from the position of the viewpoint data $D_V$ in the position specified by the display control signal $S_C$.

II. Description of the Operation

The operation of the video game to which the present embodiment pertains will now be described with the aid of flowcharts.

Figure 3:
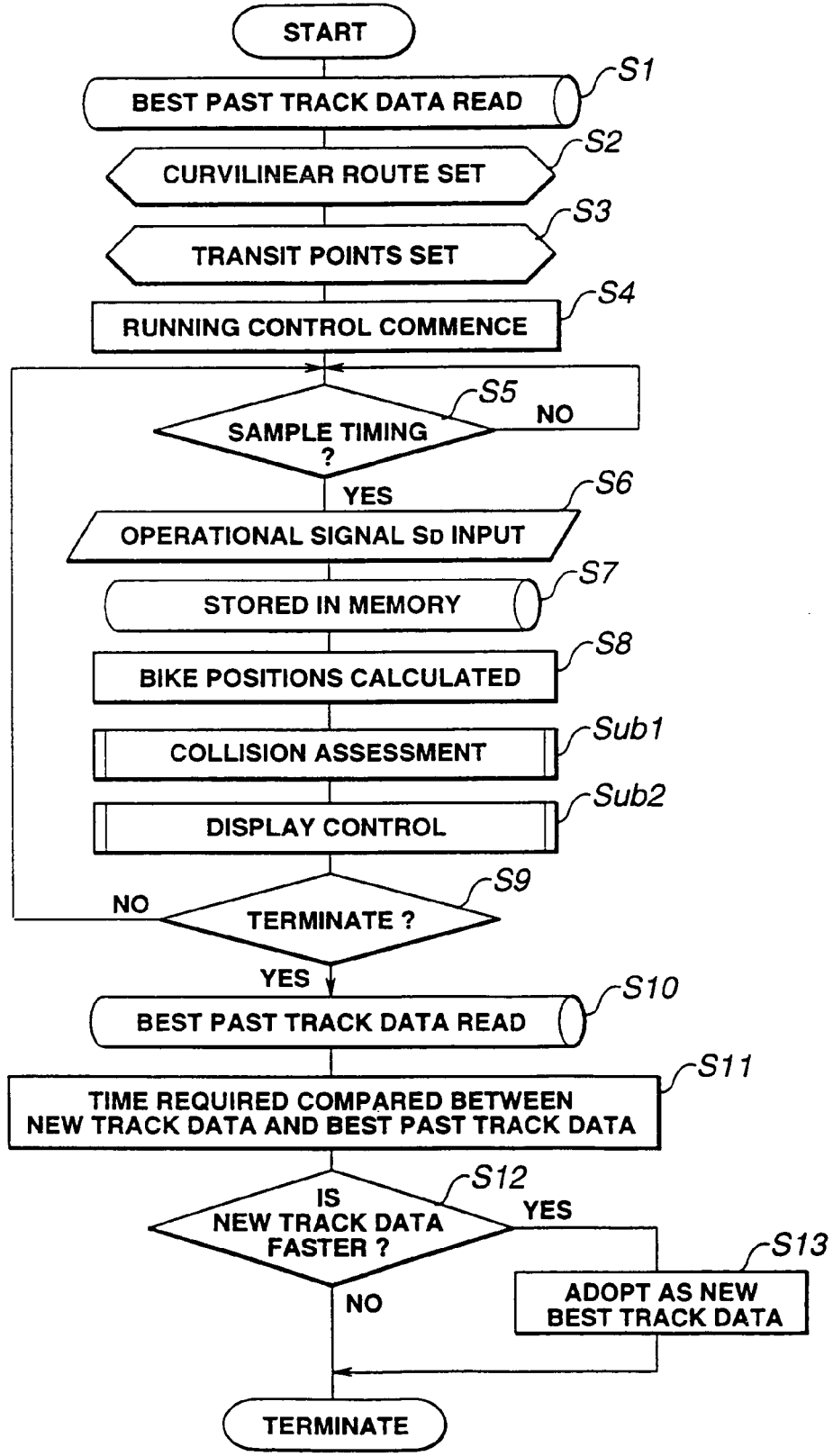
FIG. 3 is a flowchart illustrating the main routine in an aspect of the present invention.

FIG. 3 is a flowchart illustrating the main routine in the present embodiment. First, the player mounts the bike, which is to say the input device 11, and tells the game device to begin the game.

Step S1: The CPU 101 reads the best of the past track data $D_T$ stored in the RAM 103. The best data may be identified with reference to flag and other data stored together with the track data.

Figure 6A:
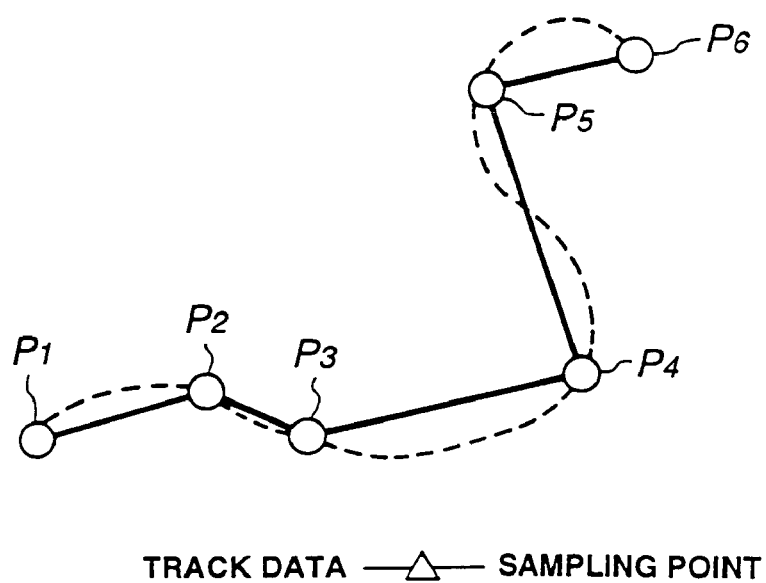
FIG. 6 is an explanatory diagram illustrating how the curvilinear route and transit points are set in an aspect of the present invention.

Step S2: The CPU 101 sets a curvilinear route such as passes through all the transit points indicated by the position coordinates which comprise the track data it has read. For instance, if a row of position coordinates such as $P_1$–$P_6$ in FIG. 6A is sampled, a curved line will be set which joins $P_1$–$P_6$. In setting the curved line, one position is taken as the base, and a function of a line which passes through two positions connected before it determines its coefficient. The function may be a secondary function, tertiary function or hyperbolic function. By linking the functions determined with each position coordinate as base it is possible to attain a curvilinear route which passes through all the points, as the broken line in FIG. 6A shows.

Figure 6B:
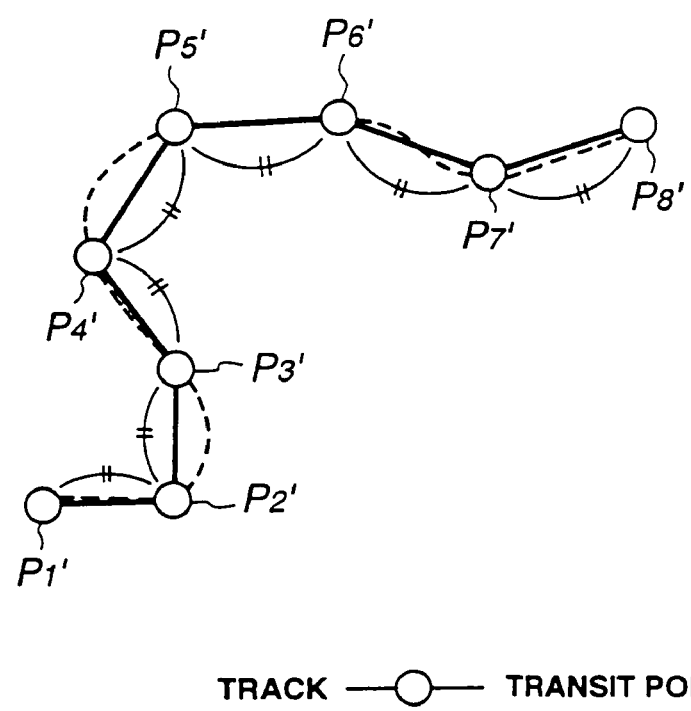

Step S3: Against this curvilinear route, as FIG. 6B shows, the CPU 101 sets transit points $P_1'$–$P_6'$ at a fixed equidistant interval. The resultant transit points $P_1'$–$P_6'$ provide the base for the path used by the other bikes.

Here it may be worth explaining the difference between the sampled track data $P_1$–$P_6$ and the transit points $P_1'$–$P_6'$ located at equidistant intervals along the curvilinear route. The track data $P_1$–$P_6$ comprises the path taken by the specific bike sampled at a fixed interval. Thus, by reading the position coordinates indicated by the track data $P_1$–$P_6$ in order at a fixed interval and causing the other bikes to run in such a manner as to pass through the transit points which have been read, it is possible to ensure that they run along the path taken by the specific bike. It is as if the specific bike were being simulated in space and time.

Meanwhile, the transit points $P_1'$–$P_6'$ are set in such a manner that the distance between them on the path is equal. Thus, reading the transit points at a fixed interval and causing the other bikes to run in such a manner as to pass through the transit points which have been read constitutes simulating the specific bike in space but not in time. The other bikes run along the path taken by the specific bike at speeds which are set individually. This means that even if the specific bike stops or crashes en route, the fact that the specific bike has decelerated or stopped does not of itself affect the running of the other bikes.

Step S4: Once the above processing is complete, the CPU 101 begins controlling the running. In other words, the motor-bike race commences in accordance with the game program, and the race between the specific bike operated by the player using the input unit and the other bikes controlled by the CPU begins.

Step S5: When the display timing (e.g. timing synchronised with an image display cycle such as the interval between returning to the upright) comes (S5: YES), the following processing is implemented.

First, the operational signal $S_D$ is input (Step S6), and the position coordinates of the specific bike on the course, which are determined in accordance with the operational state of the operational signal $S_D$ (e.g. whether the throttle is open, whether the brake is on or not, operation of the handlebars, angle of roll) are stored in the RAM 103 (Step S7).

Step S8: The running positions of the other bikes are calculated. In other words, the running of each of the bikes is controlled in such a manner that it passes through the transit points which were acquired in Step S3. The running speed of each bike depends on its type. That is to say, the performance of each bike is determined by its type, and its average speed is in turn determined by its performance.

Sub 1: Setting the transit points as above means that the running of the other bikes is controlled by the speed which is commensurate to their various performances as set. If the specific bike has crashed into the side wall or is running in an otherwise unstable manner when its track data is sampled, and the track data is applied without modification to the other bikes, the running of the other bikes also becomes unstable. In the present invention, collision assessment (Sub 1) is implemented, and the running modified if a collision or similar event is likely to occur. This is explained in detail below.

Sub 2: The position of the head of the rider riding the specific bike is determined, and an image generated which represents the running of the other bikes each adjusted from the viewpoint of the rider. This is explained in detail below.

Step S9: In this manner the image generation in one display timing is completed. If the game is not to terminate but images are to be generated in the next display timing also (S9: NO), Steps S5–8 are repeated.

Step S10: If the game is to be terminated (S9: YES), the best past track data is read.

Step S11: The number of position coordinates accumulated for each display timing in Steps S6 and S7 are compared with reference to the number of position coordinates of the best track data. Because the display timing interval is constant, the number of position coordinates which constitute the track data is directly related to the track data course record. If the number of position coordinates is small, the course record when this track data was sampled is good, whereas the opposite is true where the number of position coordinates is large.

Step S12: The number of position coordinates is compared between the newly sampled track data and the best past track data.

Step S13: If as a result of the comparison the number of position coordinates of the new track data is smaller (S12: YES), the new track data is stored as the best record (S13). Specifically, flag data signifying that the track data is the best record is stored also.

Apart from the abovementioned assessment of the course record by the number of position coordinates, it is also possible to decide the course record on the basis of the number of collisions. This is because a small number of collisions is more suitable for use as track data for the other bikes. It is also possible to record the time taken directly together with the track data, and to use this data showing the time taken when assessing the course record.

(Collision Assessment)

Figure 4:
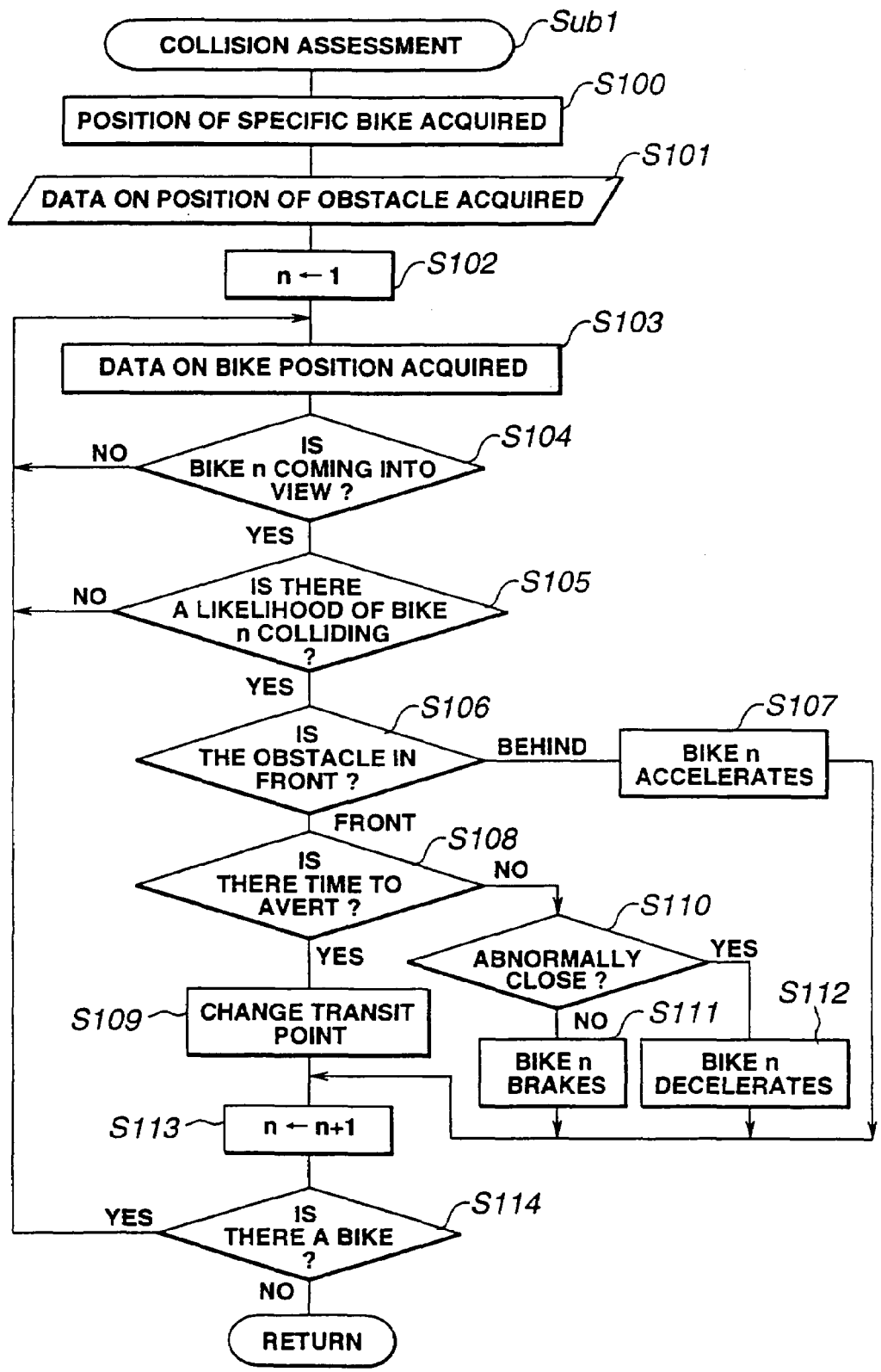
FIG. 4 is a flowchart illustrating collision assessment processing in an aspect of the present invention.

FIG. 4 is a flowchart illustrating collision assessment processing (Sub 1). When the other bikes pass a certain transit point, the closest transit point is controlled so as to become the next transit point.

Step S100: The CPU 101 and co-processor 108 refer to the position data of the specific bike calculated in Step 7 (Step 8).

Step S101: The position coordinates of an obstacle on the course which is thought to come into view from this position are read from the image data ROM 109.

Step S102: At the same time, the latest position coordinates of the other bikes are read. The counters n of the other bikes are set to 1. (Hereinafter the expression 'bike #n' will be used to denote the nth bike.)

Step S103: The position coordinates of bike #n where it ought to be at the next display timing are determined on the basis of the next targeted transit point and the speed set for the bike in question.

Step S104: Next, it is examined to see whether or not this other bike is coming into view.

Step S105: If it is coming into view (Step S104: YES), a collision assessment is implemented to check the possibility of this bike colliding with an obstacle.

For the purpose of this collision assessment processing it is possible to utilise a method such as that described in Japanese Patent H7[1995]-230559 previously submitted by the authors of the present invention. This method will be explained here in brief.

Firstly, spheres of collision with specified radii (e.g. radius r1 and radius r2) are set for the two objects which are to be assessed for collision. The distance L between the two objects is then calculated on the basis of their position coordinates, and the possibility of a collision assessed on the basis of the distance L and the sum of the radii of the collision spheres (=r1+r2). For the purpose of the present invention, the other bike which is targeted for the assessment is set as one of the spheres of collision, while the other is the obstacle (the perimeter fence around the course, or yet another bike).

As is explained below, it is also possible to assess the distance between the next transit point and the obstacle, and to alter the target from this transit point to the next if the distance is less than the prescribed one.

Step S106: If there is the likelihood of a collision (S105: YES), an assessment is implemented to check whether the obstacle is in front.

Step S107: If the obstacle is behind (S106: BEHIND), which is to say if for instance a bike is following from behind, the speed of bike #n is increased.

Step S108: If the obstacle is in front (S106: FRONT), an assessment is implemented to check whether there is time to avert a collision with the obstacle by changing course.

Step S109: As a result, if there is time to avoid the obstacle (S108: YES), the course of the bike #n is altered from one heading for the transit point directly in front of it to one heading for the next transit point.

This change of course may be explained by taking an example where, as in FIG. 7, track data has been sampled (symbol D) on the course L, and transit points $P_A$–$P_I$ (symbol m) set. When this track data is acquired, this specific bike collides with the side wall of the course L and leaves the course L temporarily. For this reason, transit point $P_C$ is set in a position which is off the course L. Where the other bikes are running through the transit point $P_X$, the CPU 101 calculates the distance d between the next transit point $P_B$ and the side wall, which is the obstacle. If this distance d is less than the standard value, the CPU 101 alters the target of the other bikes from transit point $P_B$ to transit point $P_D$. By altering the course in this manner it is possible to avoid a situation where the other bikes come abnormally close to the side wall at transit point $P_B$ and leave the course at transit point $P_C$, allowing them to continue running soothly.

Step S110: Where speed or other circumstances do not allow time to avoid the obstacle (S108: NO), an assessment is implemented to check whether or not the distance from the obstacle is abnormally close. The distance which is assessed as being abnormally close may be altered in accordance with the speed of the bike.

Step S111: Where for instance a bike comes close to one running ahead of it along the same track, and the distance between the two bikes can be maintained by deceleration (s110: NO), the bike #n is made to decelerate.

Step S112: If on the other hand the obstacle is a bike which has toppled over or a static object such as a fence, and a collision cannot be averted except by applying an emergency brake, the bike #n is made to execute a sudden stop.

This processing completes the collision assessment for one of the other bikes.

Next, the number of the bike is advance by 1 (Step S113), and so long as there are any other bikes (Step S114), Steps S103–S113 are repeated. Once collision assessment for all the other bikes is complete (Step S114: NO), the main routine is returned to.

(Display Control)

Figure 5:
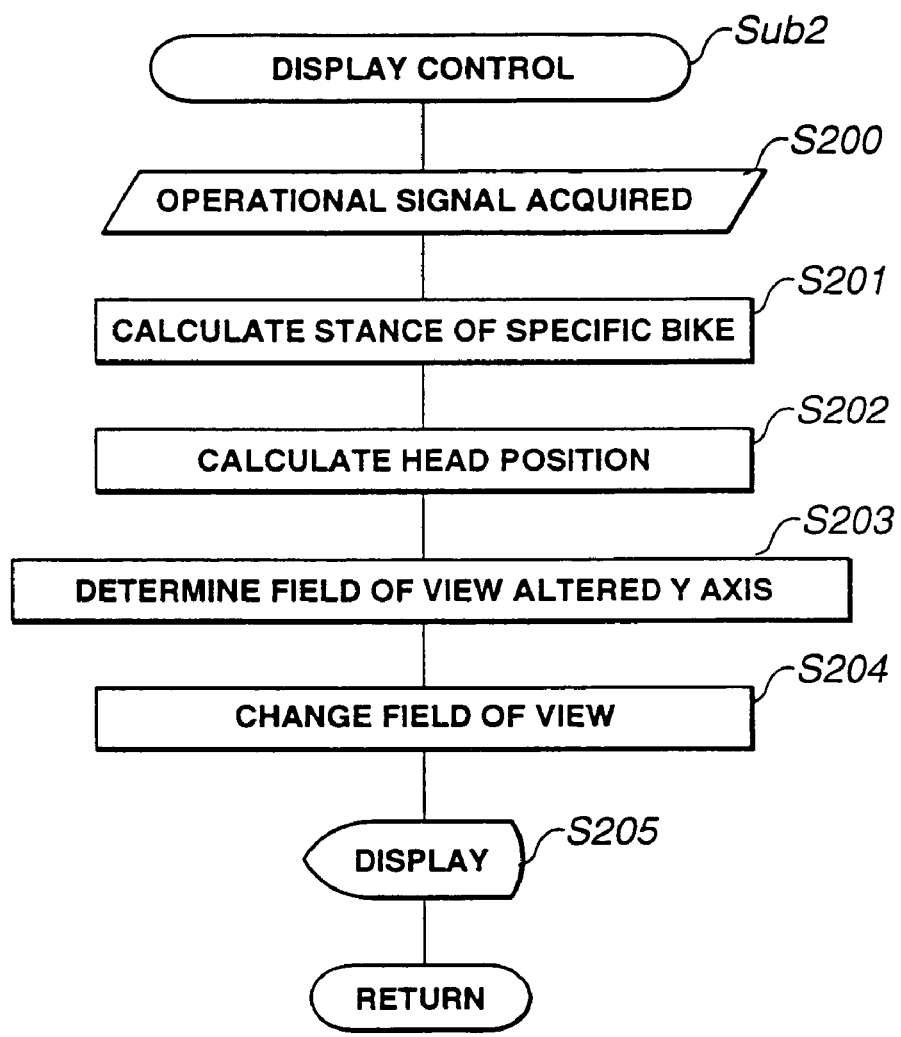
FIG. 5 is a flowchart illustrating display control in an aspect of the present invention.

FIG. 5 is a flowchart illustrating display control (Sub 2). Step S200: Firstly, the data on the angle of roll which is contained in the operational signal $S_D$ is referred to. Step S210: The CPU 101 calculates the stance of the specific bike on the basis of the data on the angle of roll. Where the data on the angle of roll is output in proportion to the degree of tilt of the input device 11, it is possible to regard the unmodified data as the stance of the specific bike.

Moreover, where data on the angle of roll is not fed from the input device 11, it is possible to calculate the direction of the centrifugal force on the bike from the speed and the amount of operation of the handlebars 11a. The stance of the specific bike may then be calculated in such a manner that direction of the centrifugal force tallies with the direction from the bike's center of gravity to where its tires touch the ground.

Step S202: The imaginary head position of the rider is calculated. While cornering during an actual race, the rider leans out towards the inner side of the curve, and prevents the bike from toppling over by lowering the overall center of gravity, thus making it possible to negotiate the curve at high speed. Thus, it is practical to consider that where the stance of the specific bike as calculated in Step S201 is inclined in relation to the road surface, the rider is leaning towards the inner side of the corner and the position of his head is away from the center of the bike. Thus, in the present invention the position of the rider's head is made to correspond with the inclination of the specific bike and altered in the direction of one side of the bike.

Step S203: The camera (viewpoint) is placed in the position of the head as calculated in Step S202, and the direction of the Y axis determined. In other words, an actual rider leans to one side of the bike while cornering, but attempts to keep his field of vision correct by holding his head straight. Thus, the present invention simulates this by keeping the Y axis parallel with the vertical direction of the virtual space. Step S204: The view of the virtual space is altered on the basis of the viewpoint and Y axis as determined, and an image is displayed which resembles the view perceived by an actual rider (Step S205).

Apart from bringing the position of the viewpoint in line with the position of the rider's head, it is also possible in response to the operation of the view-change switch 11e of the input device 11 to adopt a position of the viewpoint which, for instance, includes part of the rider's helmet as seen from behind or from the side of the rider's head.

Figure 8A:
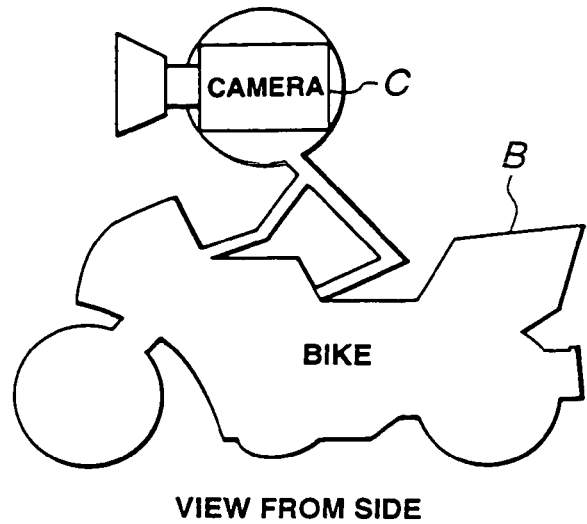
FIG. 8 is an explanatory diagram illustrating the position of the viewpoint in an aspect of the present invention.

The above display control processing makes it possible, as illustrated for example in FIG. 8A, for the game to be implemented in such a manner that it appears as if the camera C (viewpoint), which allows the acquisition of the view, is located on the head of the rider riding on the bike B.

Figure 8B:
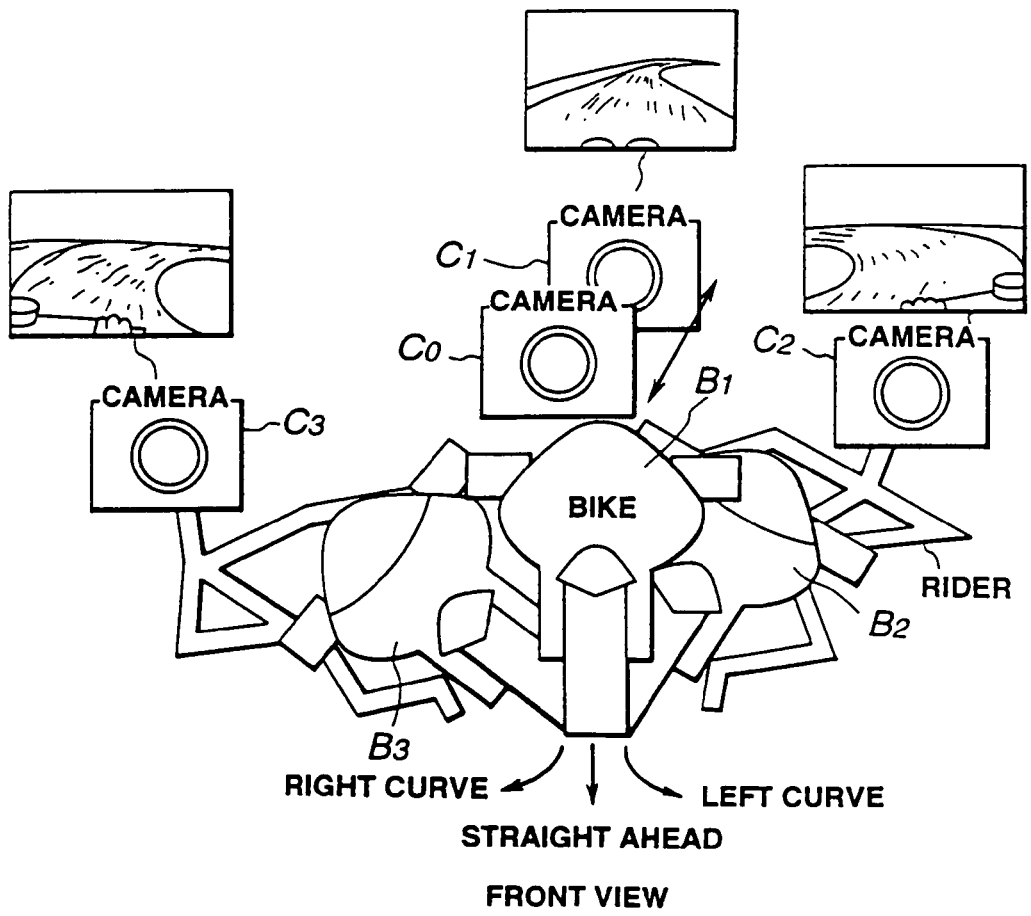
Figure 9A:
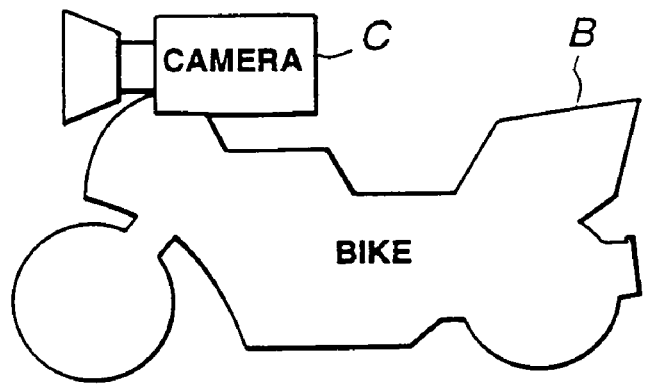
FIG. 9 is an explanatory diagram illustrating the position of the viewpoint in a conventional video game device.
Figure 9B:
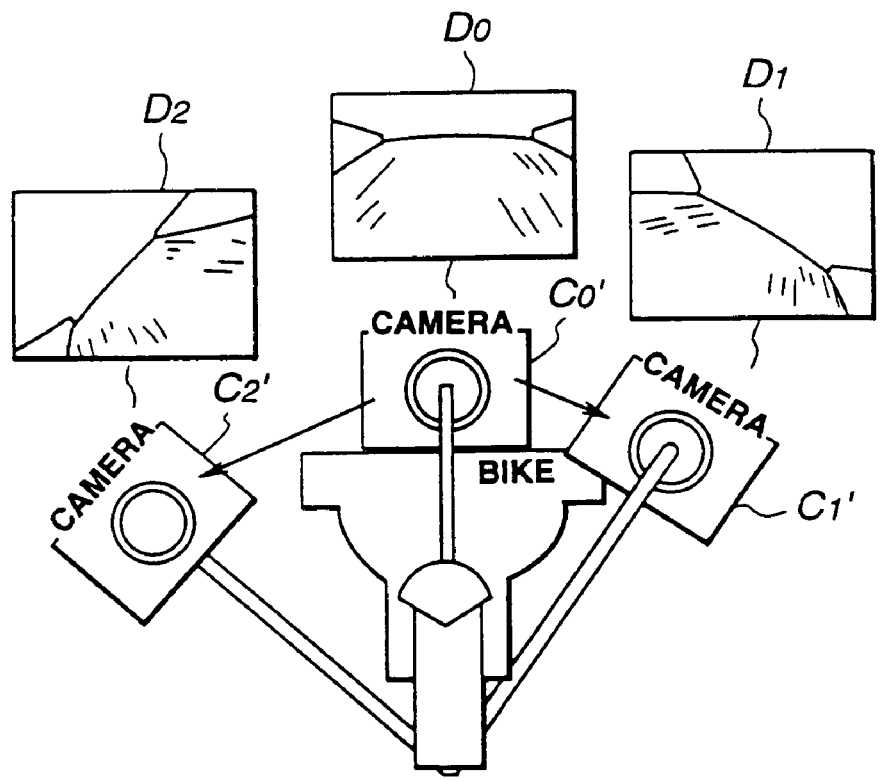

Moreover, as is shown in FIG. 8B, apart from altering the position of the viewpoint to positions such as $C_0$ and $C_1$ in line with slight inclinations of the specific bike, during a left-hand curve when the input device 11 inclines to the left, a camera position $C_2$ corresponding to the stance of the specific bike $B_2$ is selected. Similarly, during a right-hand curve when the input device 11 inclines to the right, a camera position $C_3$ corresponding to the stance of the specific bike $B_3$ is selected.

III. Effect of the Invention (a) The present invention compares track data acquired in the past with newly acquired track data, and uses track data with a good course record for the next game. Since the other bikes run according to this track data, the course record of these other bikes improve as the player gains experience, so that the relative degree of difficulty of the game for the player does not change.

(b) In particular, since the competitors are always other bikes which run in the same class as the one operated by the most skilled player, the degree of difficulty of the game is in line with the degree of experience of the players who frequent the place where the game device is located and use that game device. This means that it is possible for a wide range of consumers to enjoy a game of a suitable degree of difficulty, being neither too difficult nor to simple.

(c) Even if the track of the specific bike which has been sampled in the past leaves the course, collision assessment and route changes are implemented in controlling the running of the other bikes, so that they can be displayed without seeming unnatural. Moreover, if when the track data is sampled the specific bike has stopped or toppled over, the transit points through which the other bikes pass are determined on the basis of track data only, so that the other bikes can be displayed running naturally.

(d) The position coordinates of the rider's head in response to the tilting of the input device during cornering and at other times are calculated, and an image of the track as viewed from this head position is generated, so that the player can always enjoy the same image as an actual rider would.

(e) In addition, the fact that the inclination of the head imitates that of an actual rider means that the image is displayed without any tilting of the horizon even if the player tilts the input device. Thus, the player is able to experience the same thrills of the race as an actual rider experiences.

IV. Other Aspects

The present invention permits of numerous variations on the above embodiments. Firstly, in the above embodiments the best course record has been used as the past track data, but there are various other methods of selecting it. For example, it can be configured in such a manner that a plurality of past track data is stored, and the mean value of past course records (numbers of position coordinates) is sought when determining the curvilinear route in Step S2 of FIG. 3, the track data which most closely approximates to the mean value being selected. Using a mean course record in this manner permits large numbers of players of this game to enjoy competing against other skilled bikes.

Moreover, in the display control processing of sub-routine Sub 2 it is possible to incline the Y axis of the image during cornering by an angle obtained by multiplying the angle of roll by a prescribed coefficient k (0<k<1). In an actual race the rider attempts to keep the horizontal axis of his field of vision horizontal. However, if the curvature of the corner is small, it is thought that he is unable to correct it sufficiently, and he perceives the horizon as being slightly tilted. Thus, it is possible to generate a realistic image by displaying it as if the head were slightly inclined in line with the degree of the angle of roll.

INDUSTRIAL APPLICABILITY

The present invention allows the image of a plurality of moving objects moving in addition to a specific moving object to be generated in accordance with track data acquired in the past when the specific moving object ran along the course. It is thus possible to ensure that the other moving objects run in a manner which resembles that of the specific moving object, thus providing the player with a game which he will not tire of.

Moreover, the fact that a new route is allocated to each of the plurality of moving objects by collision assessment in order to avoid obstacles means that if it possible for the moving objects to move without colliding with one another.

By setting the position of the viewpoint of the driver during actual driving and generating a virtual image from that position, the present invention makes it possible to supply an image which is vivid and free from all unnatural qualities.

What is claimed is:

1. A game device wherein viewpoint images are generated whereby a virtual space is viewed from a stipulated viewpoint which moves together with a specific moving object, comprising:

means for determining stance whereby the stance of said moving object within the virtual space is determined;

means for determining a head position of a virtual driver on the basis of the stance of said specific moving object determined by said means for determining stance, relative position coordinates between the head of the virtual driver, which moves with said specific moving object, and said specific moving object itself are determined; and means for controlling display whereby said viewpoint is set on position coordinates determined by said means for determining head position, and said viewpoint image is generated by approximating the direction of a specified coordinate axis of said viewpoint image viewed from said viewpoint to a preset vertical direction in said space, wherein the specified coordinate axis is the Y-axis of said viewpoint image, and wherein the Y-axis is always maintained parallel to a vertical axis of a world coordinate system, the Y-axis does not shift in the virtual space, and an image is displayed that represents a view perceived by an actual driver.

2. The game device of claim 1, wherein the specific moving object is a bike and wherein the head position is made to correspond with an inclination of the bike and altered in a direction of one side of the bike.

3. A method for a game device wherein at least one viewpoint image is generated whereby a virtual space is viewed from a viewpoint which moves together with a specific moving object, the method comprising:

determining stance of said moving object within the virtual space;

determining a head position of a virtual driver on the basis of the stance of said specific moving object, wherein relative position coordinates between the head of the virtual driver, which moves with said specific moving object, and said specific moving object itself are determined; and controlling display whereby said viewpoint is set on position coordinates, and said at least one viewpoint image is generated by approximating the direction of a specified coordinate axis of said at least one viewpoint image viewed from said viewpoint to a preset vertical direction in said space, wherein the specified coordinate axis is the Y-axis of said at least one viewpoint image, and wherein the Y-axis is always maintained parallel to a vertical axis of a world coordinate system, the Y-axis does not shift in the virtual space, and an image is displayed that represents a view perceived by an actual driver.

4. The method of claim 3, wherein the specific moving object is a bike and wherein the head position is made to correspond with an inclination of the bike and altered in a direction of one side of the bike.

5. A computer-readable medium containing instructions for a method for a game device wherein at least one viewpoint image is generated whereby a virtual space is viewed from a viewpoint which moves together with a specific moving object, the method comprising:

determining stance of said moving object within the virtual space;

determining a head position of a virtual driver on the basis of the stance of said specific moving object, wherein relative position coordinates between the head of the virtual driver, which moves with said specific moving object, and said specific moving object itself are determined; and controlling display whereby said viewpoint is set on position coordinates, and said at least one viewpoint image is generated by approximating the direction of a specified coordinate axis of said at least one viewpoint image viewed from said viewpoint to a preset vertical direction in said space, wherein the specified coordinate axis is the Y-axis of said at least one viewpoint image, and wherein the Y-axis is always maintained parallel to a vertical axis of a world coordinate system, the Y-axis does not shift in the virtual space, and an image is displayed that represents a view perceived by an actual driver.

6. The computer-readable medium of claim 5, wherein the specific moving object is a bike and wherein the head position is made to correspond with an inclination of the bike and altered in a direction of one side of the bike.

* * * * *